No. 726,619. PATENTED APR. 28, 1903.
O. G. BELL.
CLINICAL THERMOMETER.
APPLICATION FILED MAY 8, 1902.
NO MODEL.
Fig. 1.
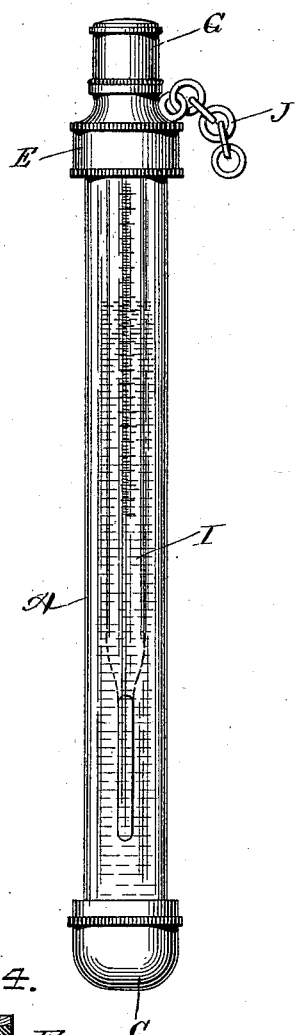
Fig. 2.
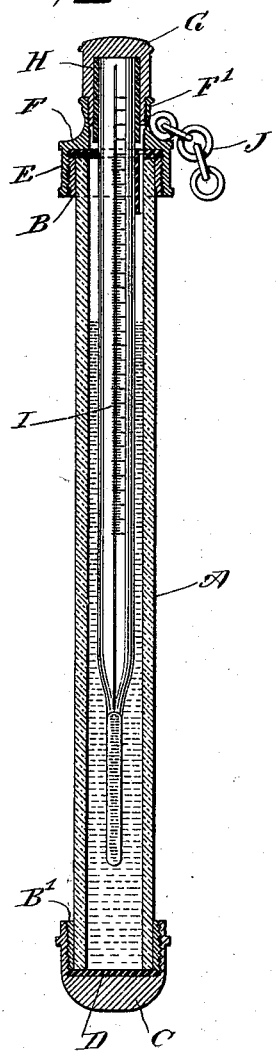
Fig. 3.
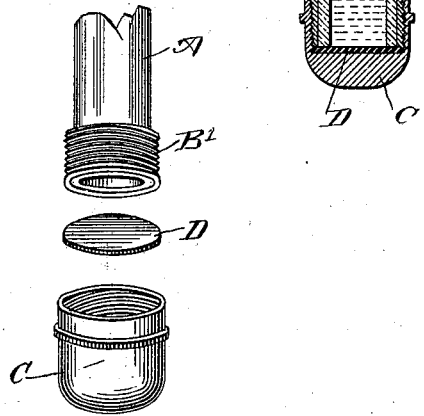
Fig. 4.
Fig. 5.
WITNESSES:
William P. Goebel
Theo. G. Hoster
INVENTOR
Oscar G. Bell
BY
Munn
ATTORNEYS

UNITED STATES PATENT OFFICE.

OSCAR G. BELL, OF NORWICH, NEW YORK, ASSIGNOR TO NORWICH PHARMACAL COMPANY, OF NORWICH, NEW YORK.

CLINICAL THERMOMETER.

SPECIFICATION forming part of Letters Patent No. 726,619, dated April 28, 1903.

Application filed May 8, 1902. Serial No. 106,381. (No model.)

*To all whom it may concern:*

Be it known that I, OSCAR G. BELL, a citizen of the United States, and a resident of Norwich, in the county of Chenango and State of New York, have invented a new and Improved Clinical Thermometer, of which the following is a full, clear, and exact description.

The object of the invention is to provide a new and improved clinical thermometer arranged to protect the glass casing against breakage at both ends and to allow of convenient filling of the casing with an antiseptic solution in which the thermometer is held immersed when inserted in and secured to the casing.

The invention consists of novel features and parts and combinations of the same, as will be more fully described hereinafter and then pointed out in the claim.

A practical embodiment of the invention is represented in the accompanying drawings, forming a part of this specification, in which similar characters of reference indicate corresponding parts in all the views.

Figure 1 is a side elevation of the improvement. Fig. 2 is a sectional side elevation of the same. Fig. 3 is a perspective view of the separated members forming the lower end of the casing. Fig. 4 is a sectional side elevation of the diaphragm on the upper end of the casing on the line 4 4 of Fig. 5, and Fig. 5 is an inverted plan view of the same.

The casing of the clinical thermometer consists, essentially, of a glass tube A, on the ends of which are secured or formed the external screw-threads B and B', of which the thread B' is engaged by a cap C, holding in its bottom a sealing-disk D, of rubber or other suitable material, so that when the cap C is screwed on this end of the tube A then it is hermetically closed to prevent escape of the antiseptic solution with which the tube is filled, the cap C also forming a protecting-cap for this end of the tube to protect the same against breakage. On the other thread B screws a head E, holding a diaphragm F on the upper end of the tube A, and in the threaded neck F' of the said head E screws a carrier G, provided with a piece of rubber tubing H, into which is inserted the upper end of the thermometer I, the resiliency of the rubber tubing being relied on to securely clamp the end of the thermometer I to securely hold the same in position in the carrier G. The head E is provided with a suitable chain J or like device for attaching the casing to the user's dress to prevent the casing from being misplaced or lost. The diaphragm F is slitted at its middle portion to allow of passing the thermometer I through the slit to wipe the thermometer clean both on its inward and outward movement, and when the thermometer is removed from the casing the diaphragm closes this end of the casing, so that the antiseptic solution is not liable to run out when the casing is placed in a horizontal position on a table or other support. In forming the casing the head E is preferably screwed securely in place on the thread B to hold the diaphragm F permanently in position, and in order to fill the tube A with the antiseptic solution after the head E and diaphragm F are in position I unscrew the cap C and hold the tube A in an upside-down position, so as to allow of filling the tube A from the bottom end of the tube. When this has been done, the cap is screwed in position on the bottom end of the tube. In a like manner when it is desired to remove the antiseptic solution from the tube A to replace the same by a fresh one the operator holds the tube A in an upside-down position, unscrews the cap C and lets the solution run out, then refills the tube with a new solution, and finally replaces the cap C.

The construction described permits of manufacturing the clinical thermometer very cheaply, especially as any ordinary glass tube A can be used for the purpose.

In case the thermometer I breaks or a physician prefers to use the thermometer without its carrier G then the latter can be readily detached from the thermometer by pulling the carrier off, the rubber tube H permitting such movement. When it is again desired to replace the thermometer on the carrier, then it is only necessary to push the upper end of the thermometer into the tube H, which securely holds the carrier in position.

Having thus described my invention, I claim as new and desire to secure by Letters Patent—

A thermometer, comprising a casing open at both ends and having an enlarged screw-threaded portion at each end, a head open at both ends screwing on one enlarged end, a thermometer-carrier screwing in the outer end of said head, a rubber tubing fitting closely in said carrier, a thermometer proper having one end held in the said tubing by the resiliency thereof, the tubing clamping the end of the thermometer and holding it in position in the carrier when the latter is unscrewed from the said head, a diaphragm engaging the other enlarged end of the tube, and a cap screwing on said end and engaging the diaphragm, as set forth.

In testimony whereof I have signed my name to this specification in the presence of two subscribing witnesses.

OSCAR G. BELL.

Witnesses:
   THEO. G. HOSTER,
   EVERARD BOLTON MARSHALL.